(12) United States Patent
Vanderheyden

(10) Patent No.: US 6,386,470 B1
(45) Date of Patent: May 14, 2002

(54) TAKEUP REEL FOR SINGLE REEL TAPE DRIVES

(75) Inventor: William J. Vanderheyden, Loveland, CO (US)

(73) Assignee: Benchmark Storage Innovations, Inc., Boulder, CO (US)

( * ) Notice: Subject to any disclaimer, the term of this patent is extended or adjusted under 35 U.S.C. 154(b) by 0 days.

(21) Appl. No.: 09/577,714

(22) Filed: May 23, 2000

(51) Int. Cl.[7] .......................... G11B 15/66; B65H 75/14; B65H 75/12
(52) U.S. Cl. ............................. 242/332.7; 242/332.4; 242/614; 242/582; 242/611
(58) Field of Search ................ 242/332.7, 332.4, 242/614, 582, 608.8, 611

(56) References Cited

U.S. PATENT DOCUMENTS 3,342,435 A * 9/1967 Gelardi et al.
6,095,445 A * 8/2000 Hentrich ................... 242/332.4

* cited by examiner

*Primary Examiner*—Donald P. Walsh
*Assistant Examiner*—Jonathan R. Miller
(74) *Attorney, Agent, or Firm*—Patton Boggs LLP

(57) ABSTRACT

The takeup reel comprises a pair of segmented flanges connected in a parallel relationship to a takeup reel hub and define a first tape containment section and a second tape containment section. The segmented flanges are ultrasonically welded to the hub and include rounded protrusions that align and guide the tape media around the hub during operation of the tape drive. At least one of the segmented flanges also includes a post that is configured to mate with a feature on the tape drive to prevent movement of the takeup reel when the tape cartridge is unloaded from and loaded into the tape drive.

5 Claims, 3 Drawing Sheets

TAKEUP REEL FOR SINGLE REEL TAPE DRIVES

FIELD OF THE INVENTION

The invention relates to digital tape drive storage devices, and in particular, to a takeup reel for single reel tape drives.

PROBLEM

Tape drives have been widely employed in industry for over thirty years due to their ability to store large amounts of data on a relatively small inexpensive removable format. The data is stored on tape drives utilizing a variety of designs, but in all cases, magnetic tape media is wound between a pair of tape reels as data is transferred to or from the tape media. The standard tape media employed in many applications is a one half-inch wide tape media housed in a tape cartridge measuring at or near 1 inch in height. Presently, all tape drives that utilize half-inch tape media are constructed in a full height five and a quarter (5.25) inch or larger form factor as defined by: EIA specification No. 3877-A "Small Form Factor 133.35 mm (5.25) Disk Drives." The full height five and a quarter (5.25) form factor measures approximately three and a half (3.5) inches tall, and therefore, half-inch tape drives occupy two drive bays when installed in a conventional computer housing.

In the art of data storage, the physical space required to store data is an important concern. Therefore, it is desirable to have a half-inch tape drive that is constructed with a half high form factor that permits installation in a single drive bay in a conventional computer housing. The half high form factor, also defined in EIA specification No. 3877-A "Small Form Factor 133.35 mm (5.25) Disk Drives" includes a maximum height of 1.634 inches. Unfortunately, in addition to the fact that the half-inch tape cartridge utilizes 1 inch of the available 1.634 inches in height, several design requirements make achieving a half-height form factor in a half-inch tape drive extremely difficult.

FIG. 1 illustrates one example of a typical half-inch tape drive 100. The tape drive 100 is a DLT tape drive that employs a single reel DLT tape cartridge design. This design includes a supply reel located within a tape cartridge (not shown) and a takeup reel 101 located within the tape drive 100. Referring to FIG. 2, the tape media on the tape cartridge is terminated at one end by a tape cartridge leader 201. The tape cartridge leader 201 is a strong flexible plastic strip containing an ovular aperture 202 on its distal end. A takeup leader 203, that connects to the takeup reel 101, is a similar plastic strip that includes a stem 204 and tab 205 designed to buckle with the ovular aperture 202 on the tape cartridge leader 201 to form buckle 200. The tape cartridge leader 201 also includes a section 206 that is slightly wider than the rest of the tape cartridge leader 201 and the takeup leader 203. The wider section 206 prevents the tape cartridge leader 201 from being pulled into the tape cartridge after the tape cartridge leader 201 and takeup leader 203 are disconnected for ejection of the tape cartridge.

Upon loading the tape cartridge into the tape drive 100, the takeup leader 203 and tape cartridge leader 201 are buckled, and the tape media is wound to a start point or read position. To accommodate the slightly wider section 206 during winding of the tape cartridge leader 201 and the takeup leader 203 around the takeup reel 101, the takeup reel 101 includes a wider stepped area 102 formed in the top and in the bottom flanges, 112 and 113, of the takeup reel 101. Unfortunately, the stepped area 102 adds approximately a quarter of an inch to the height of the takeup reel 101 and the overall height of the tape drive 100.

SOLUTION

The present invention overcomes the problems outlined above and advances the art by providing a smaller takeup reel for single reel tape drives that reduces the overall height of the drive. A first advantage of the present takeup reel is that it is substantially smaller than prior art takeup reels and still accommodates the wider section of the tape cartridge leader. A second advantage of the present takeup reel is that it does not alter the tape cartridge accommodated by the tape drive. It can be appreciated that not modifying the tape cartridge format represents a significant advantage to consumers whose data is currently stored on conventional half-inch tape cartridges. A third advantage of the present takeup reel is improved manufacturability and reduced manufacturing costs. A fourth advantage of the present takeup reel is improved strength resulting from the use of ultrasonic welding techniques. As will become apparent from the following description this represents a significant advantage over the prior art takeup reel, which is glued together using an adhesive.

The present takeup reel comprises a pair of segmented flanges connected in a parallel relationship to a takeup reel hub. The segmented flanges define a first tape containment section and a second tape containment section and include rounded protrusions that align and guide the tape media around the hub during operation of the tape drive. The wider section of the tape cartridge leader is accommodated between the first tape containment section and the second tape containment section, thus eliminating the need for the stepped section of the prior art takeup reel. The present takeup reel also includes a small post configured to mate with feature on the tape drive to prevent movement of the takeup reel when the tape cartridge is unloaded from and loaded into the tape drive. Additional features and advantages will become apparent from the following description and reference to the attached drawings.

DETAILED DESCRIPTION

For purposes of illustration and not of limitation, various features and advantages of the present invention will now be described within the context of a single reel half-inch DLT tape drive. It is to be understood that the following description with respect to a DLT tape drive is not intended to limit the scope of the present invention. It would be obvious to one skilled in the art that the principles of the present invention could be easily applied to other tape drive formats.

Figure 1:
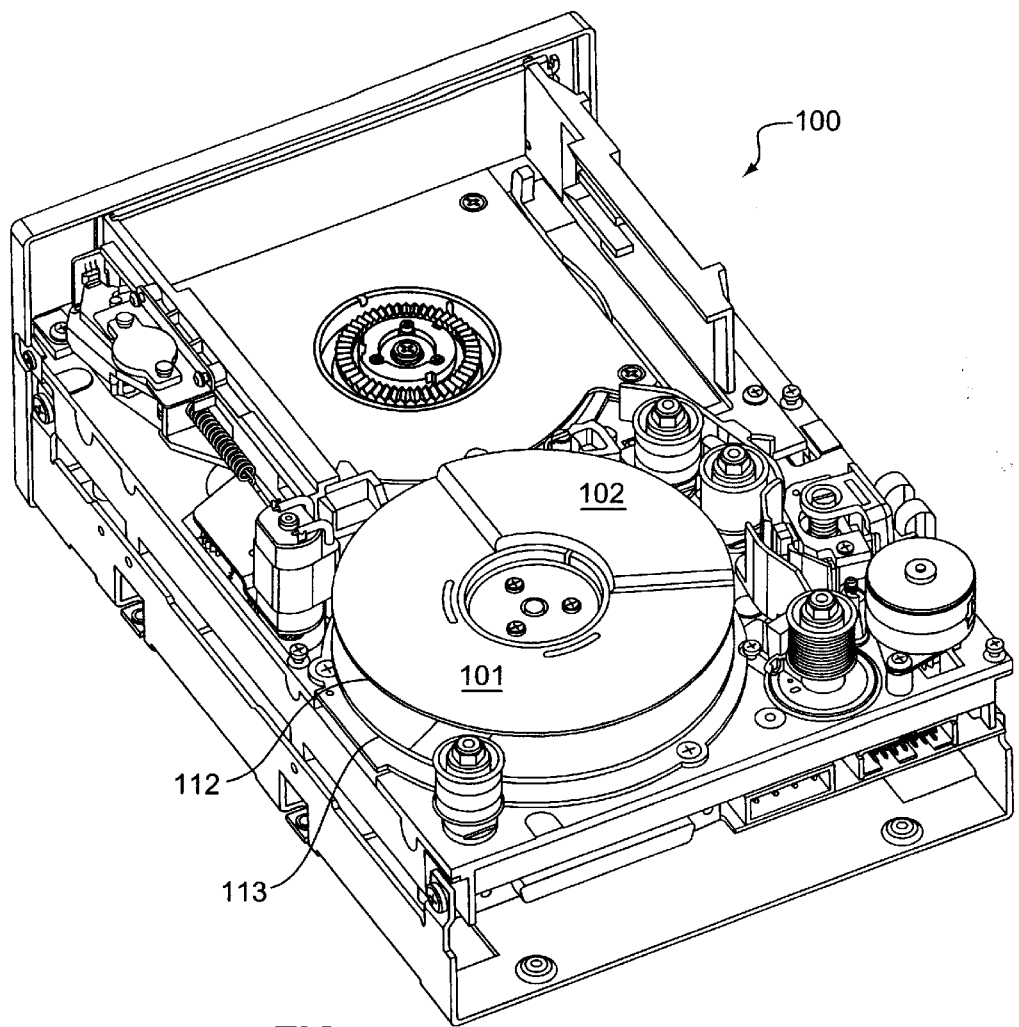
FIG. 1 illustrates a prior art tape drive configured with a prior art takeup reel.
Figure 2:
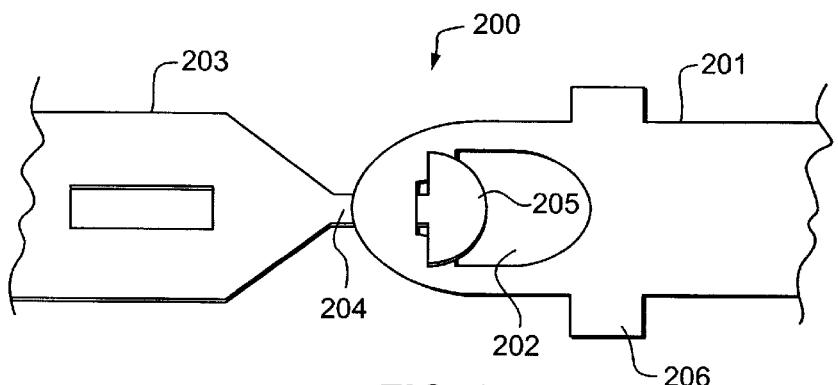
FIG. 2 illustrates an example a buckle connection between a tape cartridge leader and a takeup leader.
Figure 3:
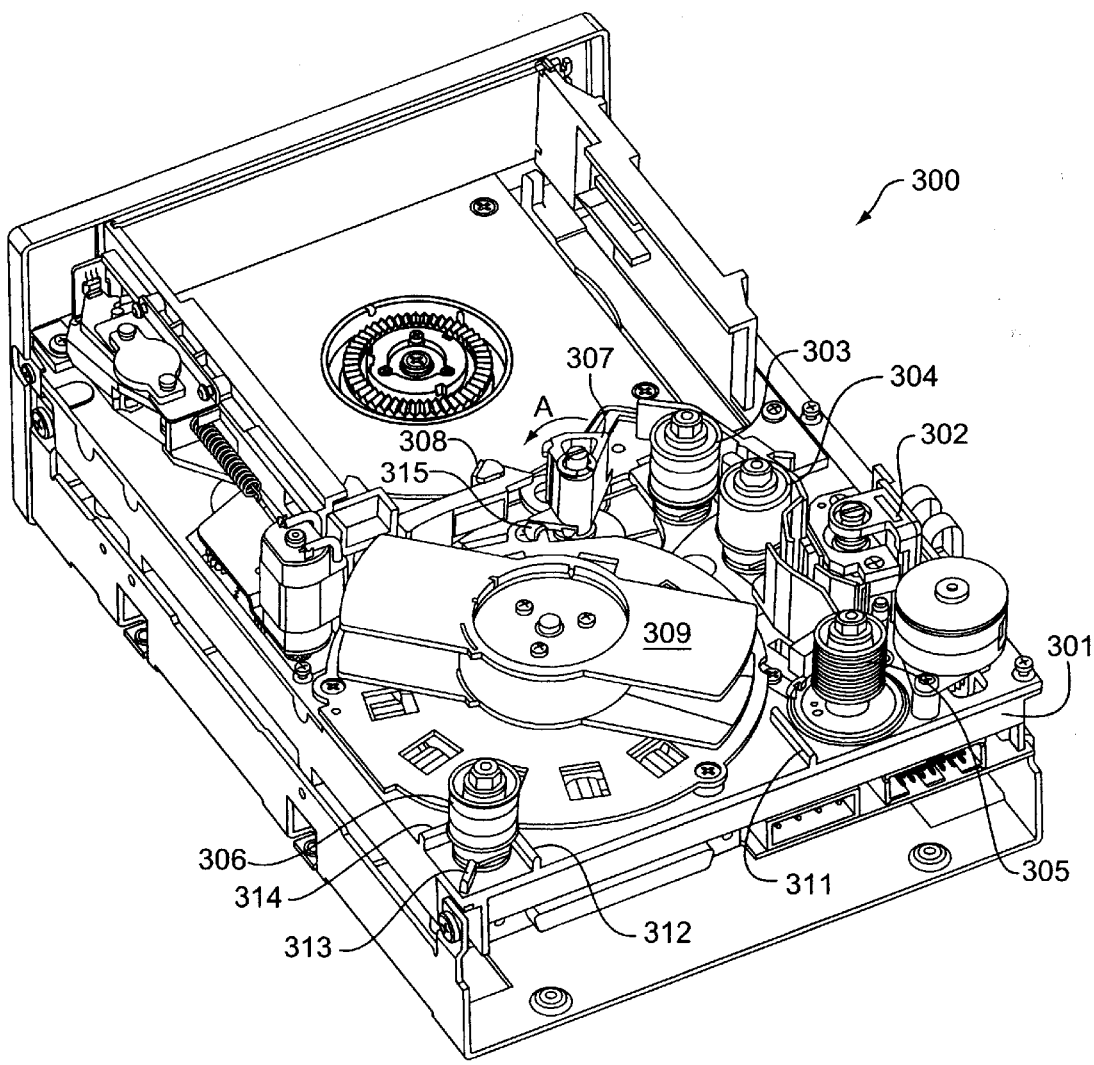
FIG. 3 illustrates a tape drive configured with a takeup reel according to the present invention.
Figure 4:
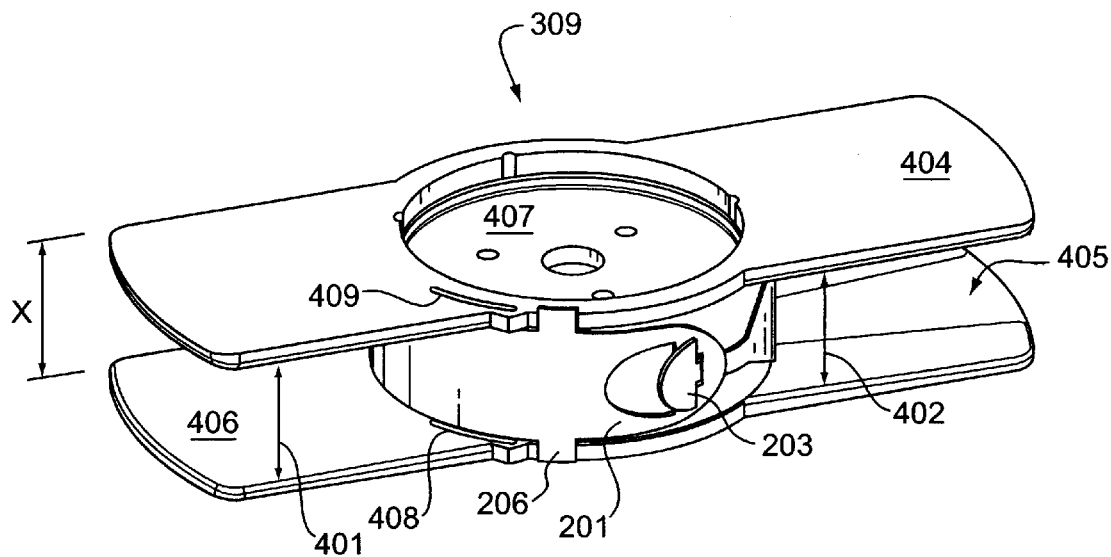
FIG. 4 illustrates a perspective view of a takeup reel according to the present invention.
Figure 5:
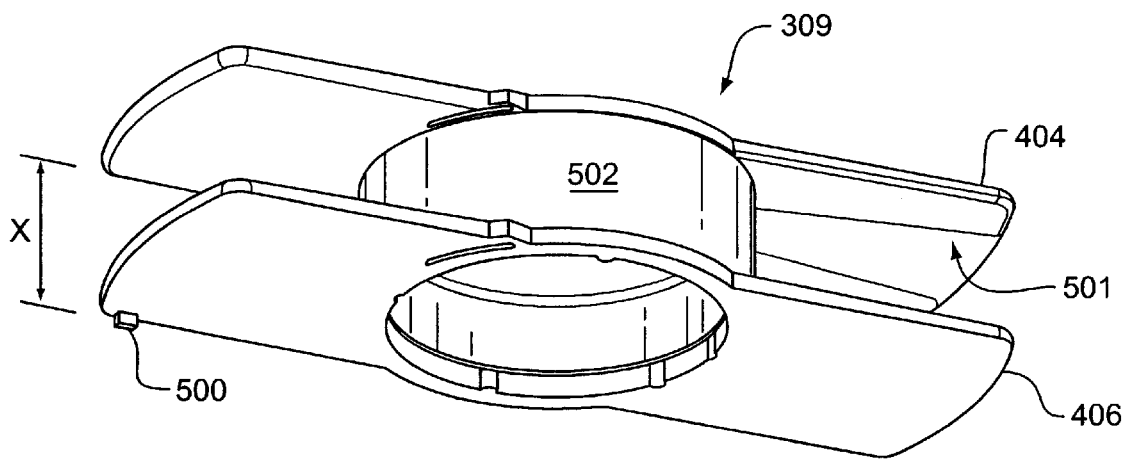
FIG. 5 illustrates a bottom perspective view of a takeup reel according to the present invention.

FIG. 3 depicts an example of a tape drive 300 configured with a takeup reel 309 according to the present invention. Referring also to FIGS. 4 and 5, there is shown perspective views of the takeup reel 309 according to the present invention. The takeup reel 309 comprises a top segmented flange 404 connected to a top portion of a takeup reel hub 407 and a bottom segmented flange 406 connected to a bottom portion of the takeup reel hub 407. The takeup reel hub 407 could be a conventional takeup reel hub that connects to the tape drive 300 in a conventional manner. This configuration of the take up reel 309 includes a height dimension "X" of no greater than 0.641 inches.

The top and bottom flanges, 404 and 406, are connected in a parallel relationship and form a first tape media containment section 401 and a second tape media containment section 402 on opposing sides of the takeup reel hub 407. The first tape media containment section 401 and the second tape media containment section 402 guide the half-inch tape media around the takeup reel hub 407 during operation of the tape drive 300. During the initial winding of the tape cartridge leader 201 and the takeup leader 203, the wider section 206 of the tape cartridge leader 201, rests between the first tape containment section 401 and the second tape containment section 402 of the takeup reel 309. This allows the wider section 206 of the tape cartridge leader 201 to extend slightly above the top and below the bottom of the takeup reel 309, as illustrated by FIG. 4.

Advantageously, this design accommodates the additional height of the tape cartridge leader 201, while reducing the overall height of the tape drive 300 by eliminating the stepped area 102 of the prior art takeup reel 101. Also advantageously, eliminating the stepped area 102 permits the top flange 404 and bottom flange 406 of takeup reel 309 to be ultrasonically welded to the takeup reel hub 407. One skilled in the art will appreciate that this represents a significant advantage over the prior art takeup reel 101, which includes glued flanges, as the stepped area 102 prevents the cost effective application of the ultrasonic welding technique.

A first slot 409, in the top flange 404, and a second slot 408, in the bottom flange 406, provide for the attachment of the takeup leader 203 to the takeup reel 309. Alternatively, the takeup leader 203 could be attached to the takeup reel 309 by any suitable manner as a matter of design choice. Some examples of other attachment techniques include without limitation, the use of a single vertical slot on the face 502 of the takeup reel hub 407 or using a bonding agent to affix the takeup leader 203 to the face 502 of the takeup reel hub 407. Those skilled in the art will appreciate that In the case of the single vertical slot the flexible takeup leader could be compressed into the slot whereupon it is allowed to expand to secure the takeup leader to the takeup reel 309.

A first rounded protrusion 501 on the underside of the top flange 404 and a second rounded protrusion 405 on the top surface of the bottom flange 406 reduce the spacing in the second tape containment section 402 in a localized area. The reduced spacing operates both to contain the tape media and align the tape media during winding and unwinding from the takeup reel 309. In alternative embodiments, the first rounded protrusion 501 and the second rounded protrusion 405 could be located on the first flange 404 and the second flange 406, but in the first tape containment section 401. Also alternatively, the rounded protrusions 501 and 405 could be included on the first flange 404 and the second flange 406 in both the first and the second tape containment sections 401 and 402. Advantageously, since highly precise tolerances must be maintained during formation of the rounded protrusions, 501 and 405, locating the critical spacing defined by protrusions, 501 and 405, in only one of the tape containment sections, 401 or 402, improves the manufacturability of the takeup reel 309 and results in lower manufacturing costs.

A small post 500 integrally formed on the underside of the bottom flange 406 provides a stop for the takeup reel 309 when a tape cartridge is unloaded from the tape drive 300. Referring back to FIG. 3, catch 307 includes a hook 315 that engages post 500 to prevent further rotation of the takeup reel 309 when catch 307 is rotated in direction "A" during unbuckling of the tape cartridge leader 201 and the takeup leader 203. The post 500 replaces the function previously performed by the stepped 30 area 102 on the bottom flange of the prior art takeup reel 101.

Still referring to FIG. 3, tape media supporting ribs 311–314 are integrally formed on the top portion of the tape deck 301. Supporting rib 311 is located between the tape guide 305 and the takeup reel 309 in a perpendicular relationship with the backside of the tape deck 301. The supporting ribs 312–314 are located around tape guide 306 as illustrate by FIG. 3. The supporting guides 311–314 are not required for proper operation of a tape drive incorporating the takeup reel 309 according to the present invention, but are relevant to the present invention because they solve a known problem with both the prior art takeup reel 101 and the present takeup reel 309.

The supporting guides 311–314 support the tape media during power interruptions in the tape drive 300. During a power interruption where proper tension is not maintained on the tape media, the tape media can fall vertically off the guide rollers 303–306. In relation to the present takeup reel 309, the tape media could also fall vertically off of the takeup reel 309 between the first tape containment section 401 and the second tape containment section 402 due to the reduction in support provided by the segmented flanges 404 and 406. If the tape media is vertically out of position when the tape drive 300 is powered back on, the tape media could be damaged by either the bottom flange 406, or the tape guides 303–306, when the tape media is pulled back into position on the takeup reel 309 and tape guides 303–306. Advantageously, the supporting ribs 311–314 prevent the tape media from falling vertically out of position during power interruptions. It should be noted, however, that where proper tension is maintained on the tape media during power interruptions, the tape media would not fall vertically off of the takeup reel 309 or the tape guides 303–306.

Those skilled in the art will appreciate variations of the above-described embodiments that fall within the scope of the invention. As a result, the invention is not limited to the specific examples and illustrations discussed above, but only by the following claims and their equivalents.

What is claimed is:

1. A takeup reel for a single reel tape drive configured to read and write data on a tape cartridge that is loadable into the tape drive, the takeup reel comprising:

a hub having means for connecting to the tape drive;

a first segmented flange connected to a top of the hub;

a second segmented flange connected to a bottom of the hub in a parallel relationship with the first segmented flange, wherein the first segmented flange and the second segmented flange define a first tape containment section and a second tape containment section; and a post integrally formed on a one of the top of the first segmented flange and the bottom of the second segmented flange that is configured to mate with feature on the tape drive to prevent movement of the takeup reel when the tape cartridge is unloaded from and loaded into the tape drive.

2. The takeup reel of claim 1, wherein the first segmented flange and the second segmented flange are ultrasonically welded to the hub.

3. The takeup reel of claim 1, further comprising:

means within the takeup reel for connecting a takeup leader that detachably buckles with a tape cartridge leader connected to a magnetic tape media so that the magnetic tape media can be wound through a tape path between the tape cartridge and the tape drive reel as data is read from and written to the magnetic tape media.

4. The takeup reel of claim 1, further comprising:

means within the first segmented flange and the second segmented flange for aligning the magnetic tape media on the hub as the magnetic tape media is wound around the hub.

5. The takeup reel of claim 4, wherein the aligning means comprises:

a pair of rounded protrusions, wherein a first rounded protrusion is integrally formed on the first segmented flange and a second rounded protrusion is integrally formed on the second segmented flange.

* * * * *